(12) United States Patent
Nakamori et al.

(10) Patent No.: US 12,155,265 B2
(45) Date of Patent: Nov. 26, 2024

(54) UNINTERRUPTIBLE POWER SUPPLY

(71) Applicant: TMEIC Corporation, Chuo-ku (JP)

(72) Inventors: Toshiki Nakamori, Chuo-ku (JP);
Yousuke Hayashi, Chuo-ku (JP)

(73) Assignee: TMEIC CORPORATION, Chuo-ku (JP)

( * ) Notice: Subject to any disclaimer, the term of this patent is extended or adjusted under 35 U.S.C. 154(b) by 0 days.

(21) Appl. No.: 18/259,822

(22) PCT Filed: Nov. 22, 2021

(86) PCT No.: PCT/JP2021/042787
§ 371 (c)(1),
(2) Date: Jun. 29, 2023

(87) PCT Pub. No.: WO2023/089825
PCT Pub. Date: May 25, 2023

(65) Prior Publication Data
US 2024/0055890 A1 Feb. 15, 2024

(51) Int. Cl.
*H02J 9/06* (2006.01)
*G06F 1/26* (2006.01)

(52) U.S. Cl.
CPC ............... *H02J 9/062* (2013.01); *G06F 1/26* (2013.01)

(58) Field of Classification Search
CPC .................................................. H02J 9/062
USPC ........................................................ 307/64
See application file for complete search history.

(56) References Cited

U.S. PATENT DOCUMENTS

| 10,164,464 B1* | 12/2018 | Ross | G06F 1/263 |
| 2005/0094339 A1* | 5/2005 | Okui | H02J 9/062 361/90 |
| 2017/0302105 A1* | 10/2017 | Toyoda | H02M 3/1588 |

FOREIGN PATENT DOCUMENTS

JP 2018-182872 A 11/2018

OTHER PUBLICATIONS

International Search Report issued Feb. 8, 2022 in PCT/JP2021/042787 filed on Nov. 22, 2021, 2 pages.

* cited by examiner

*Primary Examiner* — Joseph Chang
(74) *Attorney, Agent, or Firm* — Oblon, McClelland, Maier & Neustadt, L.L.P.

(57) ABSTRACT

A main controller includes a first programmable device, a device, and a first selector. Each controller includes a second programmable device and a second selector. The second programmable device includes a memory and a processor. The first selector connects the first programmable device to a serial communications line when the uninterruptible power supply is in operation. In response to the device receiving an instruction to perform an update process, the first selector connects the device to the serial communications line. The second selector connects the processor to the serial communications line when the uninterruptible power supply is in operation. In response to the processor receiving the instruction to perform the update process from the first programmable device while the uninterruptible power supply is in operation, the second selector connects the memory to the serial communications line.

7 Claims, 10 Drawing Sheets

UNINTERRUPTIBLE POWER SUPPLY

TECHNICAL FIELD

The present disclosure relates to an uninterruptible power supply.

BACKGROUND ART

Japanese Patent Laying-Open No. 2018-182872 (PTL 1) discloses a power supply system which includes: multiple power supplies each having a slave controller; and a master controller for giving a command to the slave controller of each power supply. In the power supply system, each slave controller is configured of a programmable device, and includes a high-speed serial communications unit connected to the master controller. Each slave controller receives command values from the master controller and transmits the operational status of the power supply to the master controller, via the high-speed serial communications unit.

CITATION LIST

Patent Literature

PTL 1: Japanese Patent Laying-Open No. 2018-182872

SUMMARY OF INVENTION

Technical Problem

The above power supply system adopts serial communications for exchange of data between the master controller and the slave controllers, thereby reducing the number of lines connected between the master controller and the slave controllers.

However, in order to update software (a program) installed in the programmable device of each slave controller, it is necessary that a computer is connected to the slave controller via a cable for programming, and data for update is downloaded from the computer to the programmable device.

Therefore, for a power supply that has a large scale, complex structure, the arrangement of the control board on which the programmable device is mounted needs to be designed, considering the ease of performance of the update process. Moreover, an increase in number of power supplies mounted on the uninterruptible power supply may cause a tremendous amount of time and labor for the update process.

Therefore, a primary object of the present disclosure is to provide an uninterruptible power supply that has a simplified configuration and is capable of efficiently updating programs.

Solution to Problem

An uninterruptible power supply according to one aspect of the present disclosure includes a main controller, a plurality of controllers, and a serial communications line. The main controller includes a first programmable device and controls the plurality of modules. The plurality of controllers each include a second programmable device, and drive the plurality of modules through communications with the main controller. The serial communications line communicatively connects the main controller and the plurality of controllers. The main controller further includes a device and a first selector. The device performs an update process for updating each of the first programmable device and the second programmable device. The first selector connects one of the first programmable device and the device to the serial communications line. The second programmable device includes: a memory storing a program; and a processor that drives a corresponding module by executing the program stored in the memory. The plurality of controllers each further include a second selector. The second selector connects one of the processor and the memory to the serial communications line. The first selector connects the first programmable device to the serial communications line while the uninterruptible power supply is in operation. The first selector connects the device to the serial communications line in response to the device receiving an instruction to perform the update process. The second selector connects the processor to the serial communications line while the uninterruptible power supply is in operation. The second selector connects the memory to the serial communications line in response to the processor receiving the instruction to perform the update process from the first programmable device while the uninterruptible power supply is in operation.

Advantageous Effects of Invention

According to the present disclosure, an uninterruptible power supply can be provided that has a simplified configuration and is capable of efficiently updating the programs.

DESCRIPTION OF EMBODIMENTS

Figure 1:
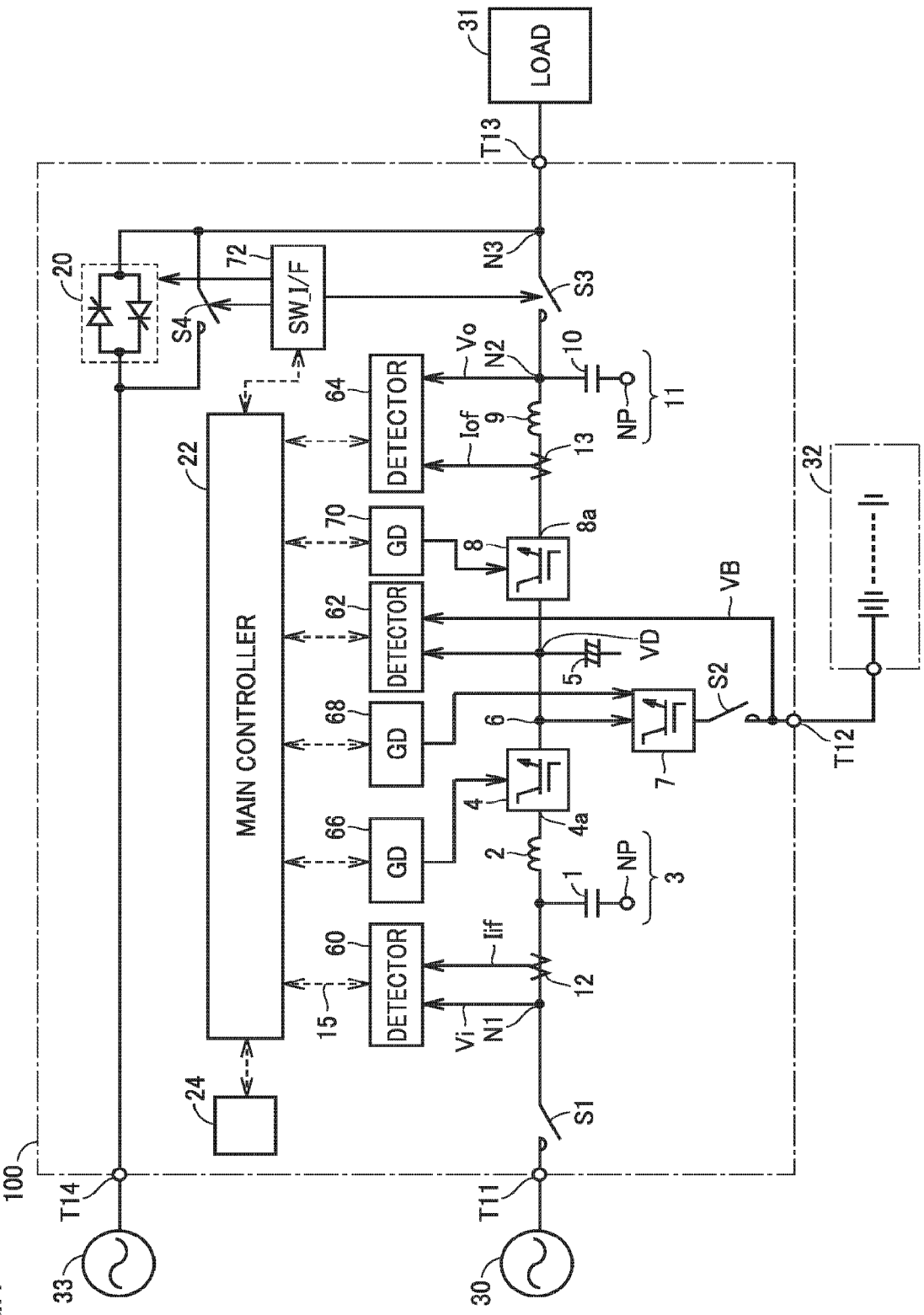
FIG. 1 is a circuit block diagram showing a configuration of an uninterruptible power supply according to Embodiment 1.

Hereinafter, embodiments according to the present disclosure are described, with reference to the accompanying drawings. Note that in the following, the same reference sign is used to refer to like or corresponding components in the drawings, and description thereof will in principle not be repeated.

Embodiment 1

FIG. 1 is a circuit block diagram showing a configuration of an uninterruptible power supply according to Embodiment 1. An uninterruptible power supply 100 according to Embodiment 1 converts a three-phase alternating-current (AC) power, supplied from a commercial AC power supply 30, into a direct-current (DC) power, converts the DC power into a three-phase AC power, and supplies the three-phase AC power to a load 31. For simplicity of the figure and description, FIG. 1 only shows circuits corresponding to one phase (e.g., U phase) among three phases (U phase, V phase, and W phase).

Referring to FIG. 1, the uninterruptible power supply 100 includes an AC input terminal T11, a battery terminal T12, an AC output terminal T13, and a bypass input terminal T14. The AC input terminal T11 receives AC power at a commercial frequency from the commercial AC power supply 30. The bypass input terminal T14 receives AC power at a commercial frequency from a bypass AC power supply 33. The bypass AC power supply 33 may be a commercial AC power supply or a generator.

The battery terminal T12 is connected to a battery 32. The battery 32 stores DC power. The battery 32 corresponds to one example of a "power storage device." The battery terminal T12 may be connected to a capacitor, instead of the battery 32. The AC output terminal T13 is connected to the load 31. The load 31 is driven by AC power.

The uninterruptible power supply 100 further includes electromagnetic contactors S1, S2, S3, and S4, current detectors 12 and 13, capacitors 1, 5, and 10, reactors 2, and 9, a converter 4, a bi-directional chopper 7, an inverter 8, a semiconductor switch 20, detectors 60, 62, and 64, gate drivers 66, 68, and 70, a switch interface (I/F) 72, an operating unit 24, and a main controller 22.

The electromagnetic contactors S1, S2, S3, and S4, the current detectors 12 and 13, the capacitors 1, 5, and 10, the reactor 2 and 9, the converter 4, the bi-directional chopper 7, the inverter 8, and the semiconductor switch 20 each correspond to one example of a "module." The detectors 60, 62, and 64, the gate drivers 66, 68, and 70, and the switch I/F 72 each correspond to one example of a "controller."

The electromagnetic contactor S1 has a first terminal connected to the AC input terminal T11, and a second terminal (a node N1) connected to a first terminal of the reactor 2. The reactor 2 has a second terminal connected to an AC terminal 4a of the converter 4. The capacitor 1 is connected between the node N1 and a neutral NP. The neutral NP receives a ground voltage, for example. The electromagnetic contactor S1 is on when the uninterruptible power supply 100 is in use, and off during the maintenance of the uninterruptible power supply 100, for example.

An instantaneous value of an AC input voltage Vi appearing at the node N1 is detected by the detector 60. The current detector 12 detects an AC input current Ii flowing through the node N1, and outputs a signal Iif indicating the detection value to the detector 60. The detector 60 is connected to the main controller 22 via the communications line 15. The communications line 15 bi-directionally transfers data through serial communications. The communications line 15 corresponds to one example of a "serial communications line." The detector 60 provides the main controller 22 via the communications line 15 with a signal indicating the detection value of the instantaneous value of the AC input voltage Vi, and the signal Iif indicating the detection value of the AC input current Ii.

The capacitor 1 and the reactor 2 form an AC filter 3, which passes therethrough the AC power at the commercial frequency, and blocks a current at a switching frequency, generated by the converter 4, from passing therethrough to the commercial AC power supply 30.

The converter 4 is controlled by the main controller 22. In normal operation during which the converter 4 is supplied with AC power from the commercial AC power supply 30, the converter 4 converts the AC power into DC power and outputs the DC power to the DC line 6. When AC power is not successfully supplied from the commercial AC power supply 30 (when the commercial AC power supply 30 is interrupted), the operation of the converter 4 is stopped. The output voltage of the converter 4 is controllable to a desired value.

Specifically, the converter 4 has multiple switching elements not shown. The switching elements are connected to the gate driver (GD) 66. The gate driver 66 is connected to the main controller 22 via the communications line 15, and drives the switching elements in accordance with gate signals provided by the main controller 22.

The capacitor 5 is connected to the DC line 6, and smooths the voltage of the DC line 6. The instantaneous value of a DC voltage VD appearing at the DC line 6 is detected by the detector 62. The DC line 6 is connected to a high-voltage side node of the bi-directional chopper 7. The bi-directional chopper 7 has a low-voltage side node connected to the battery terminal T12 via the electromagnetic contactor S2.

The electromagnetic contactor S2 is on when the uninterruptible power supply 100 is in use, and off during the maintenance of the uninterruptible power supply 100 and the battery 32, for example. An instantaneous value of a voltage VB across the battery 32 appearing at the battery terminal T12 is detected by the detector 62. The detector 62 is connected to the main controller 22 via the communications line 15. The detector 62 provides the main controller 22 via the communications line 15 with a signal indicating a detection value of the instantaneous value of the DC voltage VD, and a signal indicating a detection value of the instantaneous value of the voltage VB across the battery 32.

The bi-directional chopper 7 is controlled by the main controller 22. In the normal operation, the bi-directional chopper 7 stores the DC power, generated by the converter 4, into the battery 32. When the commercial AC power supply 30 is interrupted, the bi-directional chopper 7 supplies the DC power stored in the battery 32 to the inverter 8 via the DC line 6.

To store DC power into the battery 32, the bi-directional chopper 7 steps down the DC voltage VD of the DC line 6 and provides a resultant voltage to the battery 32. To supply the DC power stored in the battery 32 to the inverter 8, the bi-directional chopper 7 steps up the voltage VB across the battery 32 and outputs a resultant voltage to the DC line 6. The DC line 6 is connected to an input node of the inverter 8.

Specifically, the bi-directional chopper 7 has multiple switching elements not shown. The switching elements are connected to the gate driver (GD) 68. The gate driver 68 is connected to the main controller 22 via the communications line 15, and drives the switching elements in accordance with gate signals provided by the main controller 22.

The inverter 8 is controlled by the main controller 22. The inverter 8 converts the DC power, supplied from the converter 4 or the bi-directional chopper 7 via the DC line 6, into AC power at a commercial frequency, and outputs the AC power. In other words, in the normal operation, the inverter 8 converts the DC power, supplied from the converter 4 via the DC line 6, into AC power. When the commercial AC power supply 30 is interrupted, the inverter 8 converts the DC power, supplied from the battery 32 via the bi-directional chopper 7, into AC power. The output voltage of the inverter 8 is controllable to a desired value.

Specifically, the inverter 8 has multiple switching elements not shown. The switching elements are connected to the gate driver (GD) 70. The gate driver 70 is connected to the main controller 22 via the communications line 15, and drives the switching elements in accordance with gate signals provided by the main controller 22.

The inverter 8 has an AC terminal 8a connected to a first terminal of the reactor 9. The reactor 9 has a second terminal (a node N2) connected to a first terminal of the electromagnetic contactor S3. The electromagnetic contactor S3 has a second terminal (a node N3) connected to the AC output terminal T13. The capacitor 10 is connected between the node N2 and the neutral NP. The neutral NP receives the ground voltage, for example.

The current detector 13 detects the instantaneous value of an output current Io of the inverter 8, and provides the detector 64 with a signal Iof indicating the detection value. The instantaneous value of an AC output voltage Vo appearing at the node N2 is detected by the detector 64.

The detector 64 is connected to the main controller 22 via the communications line 15. The detector 64 provides the main controller 22 via the communications line 15 with a signal indicating the detection value of the instantaneous value of the AC output voltage Vo, and the signal Iof indicating the detection value of the output current Io.

The reactor 9 and the capacitor 10 form an AC filter 11, which passes therethrough the AC power at the commercial frequency, generated by the inverter 8, to the AC output terminal T13, and blocks the current at the switching frequency, generated by the inverter 8, from passing therethrough to the AC output terminal T13.

The electromagnetic contactor S3 is controlled by the main controller 22. The electromagnetic contactor S3 is on in an inverter powering mode in which the AC power generated by the inverter 8 is supplied to the load 31. The electromagnetic contactor S3 is off in a bypass powering mode in which the AC power from the bypass AC power supply 33 is supplied to the load 31.

The semiconductor switch 20 includes a pair of thyristors connected in anti-parallel to each other, and is connected between the bypass input terminal T14 and the node N3. The electromagnetic contactor S4 is connected in parallel to the semiconductor switch 20. The semiconductor switch 20 is controlled by the main controller 22. The semiconductor switch 20 is typically turned off. In the event of failure of the inverter 8, the semiconductor switch 20 is turned on instantly and supplies the AC power from the bypass AC power supply 33 to the load 31. The semiconductor switch 20 turns off after the elapse of a predetermined amount of time since it turned on.

The electromagnetic contactor S4 is off in the inverter powering mode in which the AC power generated by the inverter 8 is supplied to the load 31. The electromagnetic contactor S4 is on in the bypass powering mode in which the AC power from the bypass AC power supply 33 is supplied to the load 31.

In the event of failure of the inverter 8, the electromagnetic contactor S4 turns on and supplies the AC power from the bypass AC power supply 33 to the load 31. In other words, in the event of failure of the inverter 8, the semiconductor switch 20 instantly turns on just for a predetermined amount of time and the electromagnetic contactor S4 turns on. This is to prevent the semiconductor switch 20 from being overheated and damaged.

Specifically, the electromagnetic contactors S3 and S4 and the semiconductor switch 20 are connected to the switch I/F 72. The switch I/F 72 is connected to the main controller 22 via the communications line 15. The switch I/F 72 turns on or off the electromagnetic contactors S3 and S4 and the semiconductor switch 20, in accordance with an on command or an off command provided by the main controller 22.

The operating unit 24 includes multiple buttons operated by a user of the uninterruptible power supply 100, a display for showing various information, and so on. By operating the operating unit 24, the user can power on or off the uninterruptible power supply 100, select one of the bypass powering mode and the inverter powering mode, etc.

Figure 2:
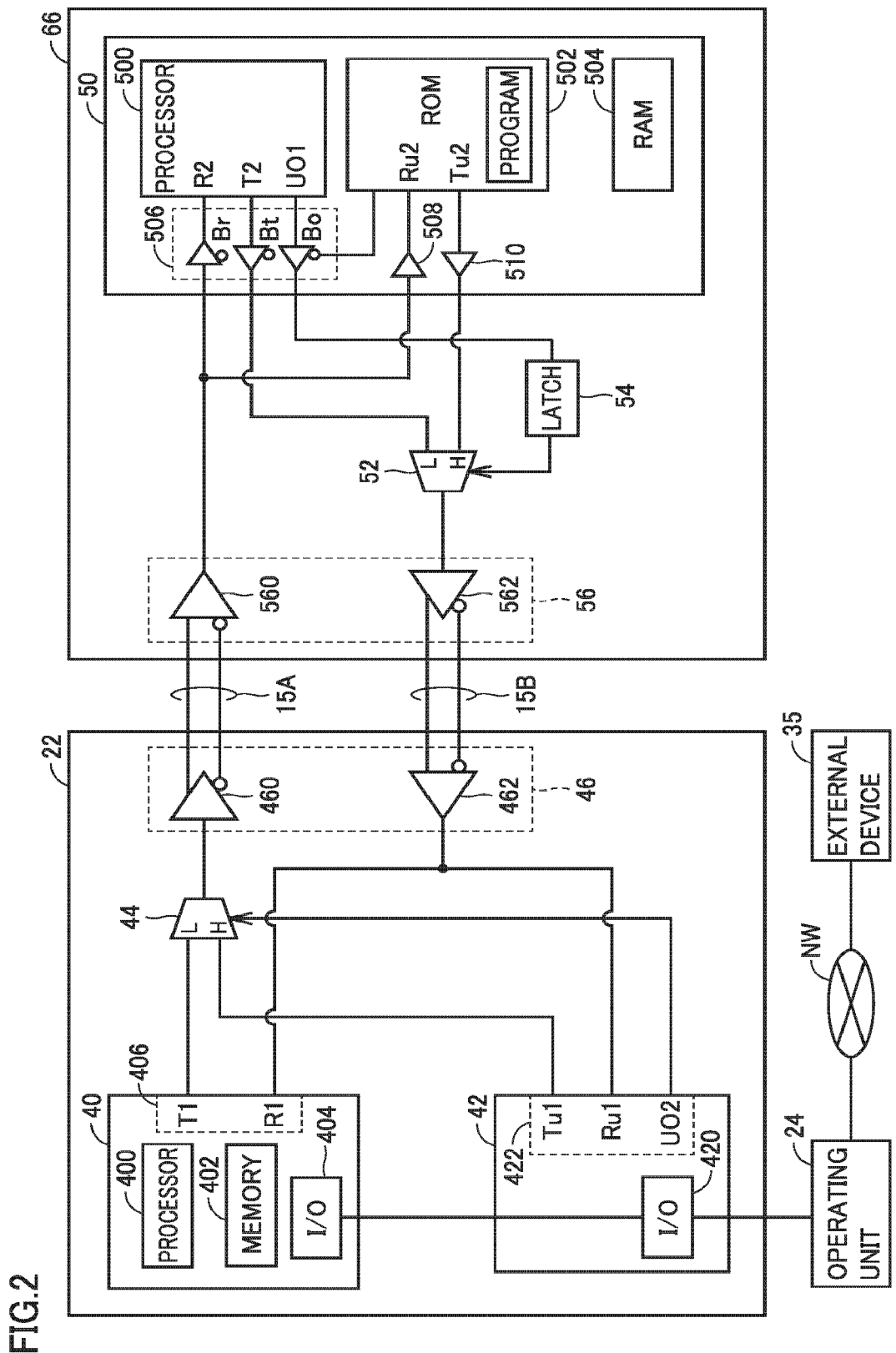
FIG. 2 is a block diagram showing a configuration of a main controller and a gate driver.

The operating unit 24 is connected to a communication network NW and capable of exchanging data with an external device 35 of the uninterruptible power supply 100 via the communication network NW (see FIG. 2). The external device 35 includes, for example, a personal computer (PC) or a server. The operating unit 24 may further include a USB connector. In this case, the operating unit 24 exchanges the data with the external device 35 via the USB connector.

The programs installed in the main controller 22, the detectors 60, 62, 64, the gate drivers 66, 68, and 70, and the switch I/F 72 can be updated by the user directly operating the operating unit 24 or remotely operating the operating unit 24 using the external device 35. Details of the program update process will be described below.

The main controller 22 controls the entirety of the uninterruptible power supply 100, based on a signal from the operating unit 24 and signals from the detectors 60, 62, and 64, for example. In other words, the main controller 22 detects whether the commercial AC power supply 30 is interrupted, based on the detection value of the AC input voltage Vi, and controls the converter 4 and the inverter 8 in synchronization with the phase of the AC input voltage Vi.

The main controller 22 also controls the converter 4, based on the AC input voltage Vi, the AC input current Ii, and the DC voltage VD. In the normal operation, the main controller 22 controls the converter 4 so that the DC voltage VD is a desired target voltage VDT. When the commercial AC power supply 30 is interrupted, the main controller 22 stops the operation of the converter 4.

The main controller 22 also controls the bi-directional chopper 7, based on the DC voltage VD and the battery voltage VB. In the normal operation, the main controller 22 controls the bi-directional chopper 7 so that the battery voltage VB is a desired target battery voltage VBT. When the commercial AC power supply 30 is interrupted, the main controller 22 controls the bi-directional chopper 7 so that the DC voltage VD is a desired target voltage VDT.

The main controller 22 also controls the inverter 8 based on the AC output current Io and the AC output voltage Vo so that the AC output voltage Vo is a desired target voltage VoT.

The controlling of the converter 4, the bi-directional chopper 7, and the inverter 8 described above is implemented by each of the main controller 22, the detectors 60, 62, and 64, the gate drivers 66, 68, and 70, and the switch I/F 72 executing the previously installed program and exchanging data with each other via the communications line 15.

In other words, the detectors 60, 62, and 64, the gate drivers 66, 68, and 70, and the switch I/F 72 each correspond to one example of a "controller" for controlling the operations of the modules of the uninterruptible power supply 100, under the control by the main controller 22 controlling the entirety of the uninterruptible power supply 100. In the present embodiment, data can be exchanged between the main controller and each controller by the serial communications. This can prevent an increase in number of lines connected to the main controller 22 even if the number of modules is increased.

Next, a configuration of the main controller 22, the detectors 60, 62, and 64, the gate drivers 66, 68, and 70, and the switch I/F 72 is described. The detectors 60, 62, and 64, the gate drivers 66, 68, 70, and the switch I/F 72 have the same basic configuration and thus a configuration of the gate driver 66 will be illustrated representatively.

FIG. 2 is a block diagram showing a configuration of the main controller 22 and the gate driver 66.

Referring to FIG. 2, the main controller 22 and the gate driver 66 are bi-directionally communicatively connected by the communications line 15. The communications line 15 bi-directionally transfers data through serial communications. The communications line 15 includes a communications line 15A for transferring data from the main controller 22 to the gate driver 66, and a communications line 15B for transferring data from the gate driver 66 to the main controller 22.

The main controller 22 and the gate driver 66 execute programs previously stored in memories, thereby controlling the converter 4 in cooperation with each other. The main controller 22 and the gate driver 66 have two communications modes, which are a "normal communications mode" in which they perform two-way communications while the uninterruptible power supply 100 is in operation, and an "update mode" in which they perform two-way communications for updating the programs stored in the respective memory devices.

Note that the normal communications mode is the default communications mode. Upon receiving, from the operating unit 24, an instruction to perform an update process, the main controller 22 and the gate driver 66 each transition the communications mode from the normal communications mode to the update mode.

The main controller 22 includes a programmable device 40, a device 42 for update, a selector 44, and a serial communications I/F 46.

The programmable device 40 includes a processor 400, a memory 402, an input/output (I/O) circuit 404, and a communications I/F 406. The processor 400, the memory 402, the I/O circuit 404, and the communications I/F 406 can transmit/receive signals to each other via a bus not shown. The programmable device 40 may be implemented as a control board which includes the processor 400. The programmable device 40 corresponds to one example of a "first programmable device."

The processor 400 is configured of at least one integrated circuit. The integrated circuit can be configured of, for example, at least one central processing unit (CPU), at least one micro processing unit (MPU), at least one field programmable gate array (FPGA), or a combination thereof.

The memory 402 includes a read only memory (ROM), a random access memory (RAM), and a non-volatile memory device. The processor 400 executes various programs, thereby controlling the operation of the uninterruptible power supply 100. The processor 400 reads a program from the non-volatile memory device into the ROM. The RAM functions as a working memory, and temporarily stores various data that are required to execute programs. The I/O circuit 404 is connected to the operating unit 24 and the device 42 for update, and can transmit/receive signals to/from the operating unit 24 and the device 42 for update.

The communications I/F 406 is an interface for exchange of data between the programmable device 40 and the gate driver 66 in the normal communications mode.

In the normal communications mode, the programmable device 40 generates and outputs a transmission signal T1 to a first input terminal of the selector 44. The programmable device 40 has a parallel-to-serial converter for converting the transmission signal T1, which is parallel data, into serial data.

The device 42 for update (hereinafter, also referred to simply as a "device") is used to update the programmable devices 40 and 50 that are included in the main controller 22 and the gate driver 66, respectively. The device 42 operates with the instruction by the operating unit 24 and performs the update process for updating the programmable devices 40 and 50. The device 42 may be integrated with the programmable device 40, or a separate component from the programmable device 40. The device 42 corresponds to one example of a "device."

The device 42 includes an I/O circuit 420 and a communications I/F 422. The I/O circuit 420 and the communications I/F 422 can transmit/receive signals to each other via a bus not shown.

The I/O circuit 420 is connected to the programmable device 40 and the operating unit 24, and can transmit/receive signals to/from the programmable device 40 and the operating unit 24. The communications I/F 422 is an interface for exchange of data between the device 42 and the gate driver 66 in the update mode.

In the update mode, the device 42 receives data required to perform the update process, from the operating unit 24 via the I/O circuit 420. Using the data provided by the operating unit 24, the device 42 generates and outputs a transmission signal Tu1 for updating the programmable device 50, to a second input terminal of the selector 44. The device 42 has a parallel-to-serial converter for converting the transmission signal Tu1, which is parallel data, into serial data.

The device 42 also receives an update mode transition flag Fu from the operating unit 24 via the I/O circuit 420, indicating an instruction to perform the update process. In the normal communications mode, the update mode transition flag Fu is off, and set to on in response to the instruction to perform the update process.

When the update mode transition flag Fu is on, the device 42 generates and outputs an output signal UO2 activated to a level H (a logic high) to the selector 44. When the update mode transition flag Fu is off, the device 42 outputs the output signal UO2 at a level L (a logic low) to the selector 44.

The selector 44 receives, through the first input terminal, the transmission signal T1 for regular communications output from the programmable device 40, and receives, through the second input terminal, the transmission signal Tu1 for update, output from the device 42. In response to the output signal UO2 provided by the device 42, the selector 44 selects and outputs one of the two input signals to the driver 460 included in the serial communications I/F 46. Specifically, if the output signal UO2 is at level L, the selector 44 selects the transmission signal T1 output from the programmable device 40, and outputs it to the driver 460. If the output signal UO2 is at level H, in contrast, the selector 44 selects the transmission signal Tu1 output from the device 42, and outputs it to the driver 460. The selector 44 corresponds to one example of a "the first selector."

The serial communications I/F 46 is a communications interface for exchange of various data between the main controller 22 and the gate driver 66 through serial communications using the communications line 15. The serial communications I/F 46 has a driver 460 and a receiver 462.

A transmission signal output from the selector 44 is provided to the driver 460. The driver 460 transmits data corresponding to the transmission signal to the controller 14 via the communications line 15A.

The receiver 462 receives the data transmitted from the gate driver 66 via the communications line 15B, and outputs it as a reception signal to the programmable device 40 or the device 42. In the normal communications mode, the receiver 462 outputs the data from the gate driver 66 to the programmable device 40 as a reception signal R1 for regular communications. In the update mode, the receiver 462 outputs the data from the gate driver 66 to the device 42 as a reception signal Ru1 for update.

Upon receiving the reception signal R1 output from the receiver 462, the programmable device 40 performs a predetermined process, based on the reception signal R1. The programmable device 40 has a serial-to-parallel converter for converting the reception signal R1, which is serial data, into parallel data.

Upon receiving the reception signal Ru1 for update output from the receiver 462, the device 42 performs a predetermined process, based on the reception signal Ru1. The device 42 has a serial-to-parallel converter for converting the reception signal Ru1, which is serial data, into parallel data.

The gate driver 66 includes a programmable device 50, a selector 52, a latch circuit 54, and a serial communications I/F 56.

The programmable device 50 includes a processor 500, a ROM 502, a RAM 504, a buffer circuit 506, a receive terminal 508 for update, and a transmit terminal 510 for update. These components are capable of transmitting/receiving signals to each other via a bus not shown. The programmable device 50 may be implemented as a control board which includes the processor 500. The programmable device 50 correspond to one example of a "second programmable device."

The processor 500 is configured of at least one integrated circuit. The integrated circuit can be configured of, for example, at least one CPU, at least one MPU, at least one FPGA, or a combination thereof.

The processor 500 executes various programs, thereby driving the switching element included in the converter 4. The processor 500 deploys the program stored in the ROM 502 to the RAM 504 and executes it. Various processes to be performed by the processor 500 are written to the program stored in the ROM 502. The RAM 504 functions as a working memory and temporarily stores various data that are required to execute programs.

In the normal communications mode, the programmable device 50 generates and outputs a transmission signal T2 for regular communications to the buffer circuit 506. The programmable device 50 has a parallel-to-serial converter for converting the transmission signal T2, which is parallel data, into serial data.

The buffer circuit 506 includes a transmit buffer Bt, a receive buffer Br, and an output buffer Bo. The transmit buffer Bt is connected to a first input terminal of the selector 52. The transmit buffer Bt temporarily stores the transmission signal T2 output from the processor 500.

The receive buffer Br temporarily stores the reception signal R2 for regular communications to be input to the processor 500. Note that if the main controller 22 receives the update mode transition flag Fu from the operating unit 24 in the normal communications mode, the processor 500 receives the update mode transition flag Fu transferred from the main controller 22 via the receive buffer Br.

Upon receiving the update mode transition flag Fu, the processor 500 generates and outputs an output signal UO1 activated to level H to the selector 52. If the processor 500 does not receive the update mode transition flag Fu, the processor 500 outputs the output signal UO1 at level L to the selector 52. The output buffer Bo temporarily stores the output signal UO1 output from the processor 500. The latch circuit 54 is disposed between the output buffer Bo and the selector 52, and latches the output signal UO1 output from the output buffer Bo.

The output buffer Bo further outputs the output signal UO1 to the ROM 502. Based on the output signal UO1 provided by the output buffer Bo, the ROM 502 determines the mode of communications between the main controller 22 and the gate driver 66. Specifically, if the output signal UO1 is at level L, the ROM 502 determines that the mode of communications is the normal communications mode. If the output signal UO1 is at level H, the ROM 502 determines that the mode of communications mode is the update mode.

The receive terminal 508 and the transmit terminal 510 are connected to the ROM 502. The receive terminal 508 and the transmit terminal 510 are used to transmit/receive data for updating the program stored in the ROM 502. The receive terminal 508 is connected to the receiver 560 included in the serial communications I/F 56, and inputs a reception signal Rut, output from the receiver 560, to the ROM 502. The transmit terminal 510 is connected to the second input terminal of the selector 52, and inputs a transmission signal Tu2, generated by the ROM 502, to the second input terminal of the selector 52.

The selector 52 receives, through the first input terminal, the transmission signal T2 for regular communications from the processor 500, and receives, through the second input terminal, the transmission signal Tu2 for update output from the ROM 502. In response to the output signal UO1 provided by the processor 500, the selector 52 selects and outputs one of the two input signals to the driver 562 included in the serial communications I/F 56. When the output signal UO1 is at level L, the selector 52 selects the transmission signal T2 from the processor 500, and outputs it to the driver 562. When the output signal UO1 is at level H, in contrast, the selector 52 selects the transmission signal Tu2 from the ROM 502, and outputs it to the driver 562. The selector 52 corresponds to one example of a "the second selector."

The serial communications I/F 56 is a communications interface for exchange of various data between the gate driver 66 and the main controller 22 through serial communications using the communications line 15. The serial communications I/F 56 has a receiver 560 and a driver 562.

The receiver 560 receives the data transmitted from the main controller 22 via the communications line 15A, and outputs it as a reception signal to the processor 500 or the ROM 502. In the normal communications mode, the receiver 560 outputs the data from the main controller 22 to the processor 500 as a reception signal R2 for regular communications. In the update mode, the receiver 560 outputs the data from the main controller 22 to the ROM 502 as a reception signal Ru2 for update.

Upon receiving the reception signal R2 output from the receiver 560, the processor 500 performs a predetermined process, based on the reception signal R2. The processor 500 has a serial-to-parallel converter for converting the reception signal R2, which is serial data, into parallel data.

Upon receiving the reception signal Ru2 output from the receiver 560, the ROM 502 performs the update process, based on the reception signal Ru2. The ROM 502 has a serial-to-parallel converter for converting the reception signal Ru2, which is serial data, into parallel data.

A transmission signal output from the selector 52 is provided to the driver 562. The driver 562 transmits data corresponding to the transmission signal to the main controller 22 via the communications line 15B.

Next, two-way communications between the main controller 22 and the gate driver 66 in the normal communications mode and in the update mode will be described.

<Normal Communications Mode>

Figure 3:
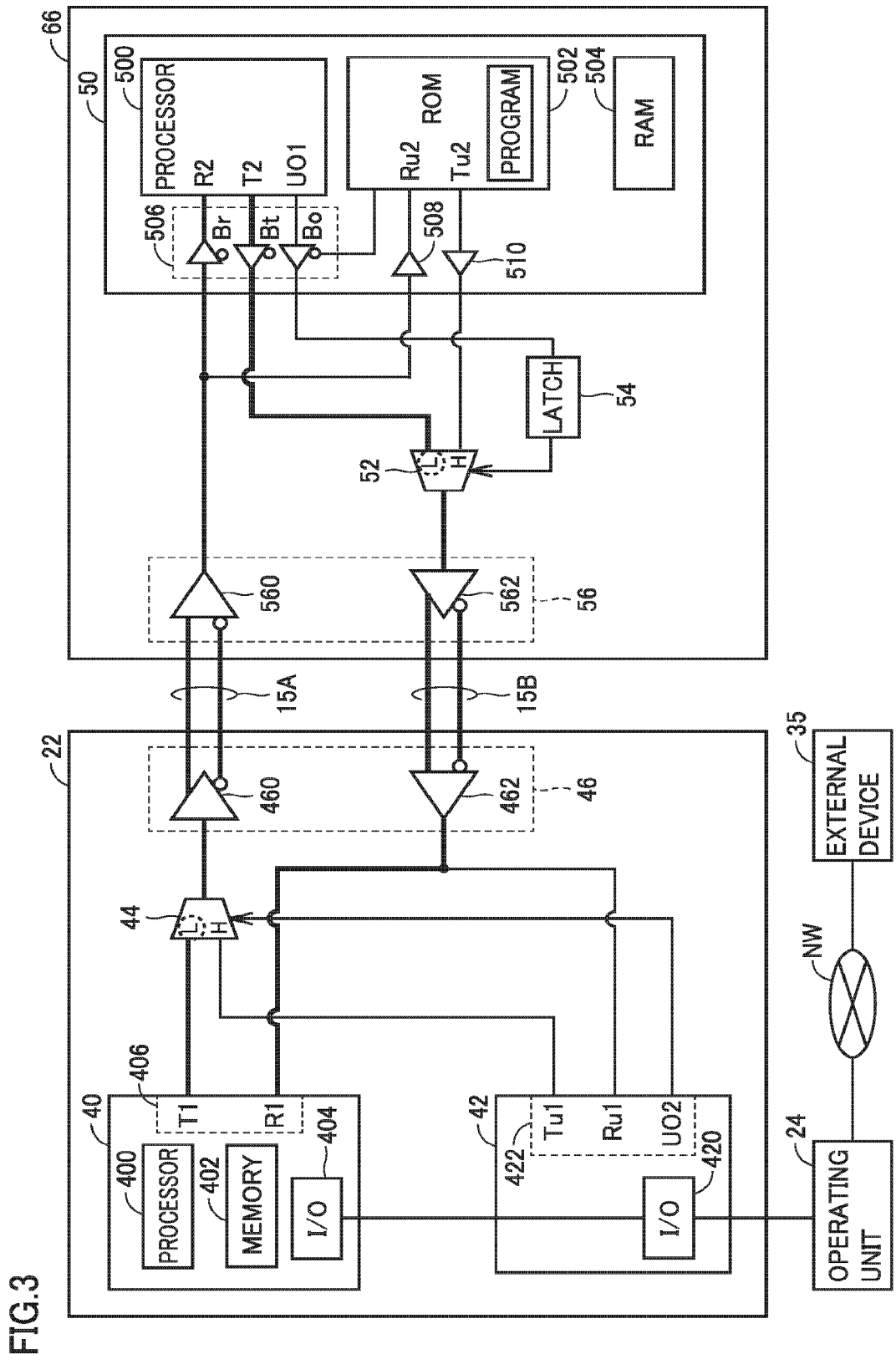
FIG. 3 is a diagram illustrating two-way communications in a normal communications mode.

FIG. 3 is a diagram illustrating two-way communications performed in the normal communications mode.

Referring to FIG. 3, in the normal communications mode, the programmable device 40 of the main controller 22 and the programmable device 50 (the processor 500) of the gate driver 66 exchange data via the communications line 15.

Specifically, in the normal communications mode, the update mode transition flag Fu is off. When the update mode transition flag Fu is off, the device 42 outputs the output signal UO2 at level L to the selector 44.

The selector 44 receives, through the first input terminal, the transmission signal T1 output from the programmable device 40, and receives, through the second input terminal, the transmission signal Tu1 output from the device 42. If the output signal UO2 is at level L, the selector 44 selects the transmission signal T1 output from the programmable device 40, and outputs it to the driver 460. The transmission signal T1 output from the selector 44 is transmitted to the gate driver 66 via the communications line 15A.

In the controller 14, the receiver 560 receives the transmission signal T1 via the communications line 15A. In the normal communications mode, the receiver 560 outputs the transmission signal T1 to the receive buffer Br. The receive buffer Br outputs the transmission signal T1 to the processor 500 as the reception signal R2.

The processor 500 outputs the output signal UO1 at level L to the selector 44. The processor 500 further transfers the output signal UO1 at level L to the ROM 502 via the output buffer Bo. Based on the output signal UO1 at level L provided by the output buffer Bo, the ROM 502 determines that the communications mode is the normal communications mode.

The output buffer Bo provides the output signal UO1 at level L to the selector 52 via the latch circuit 54. The latch circuit 54 latches the output signal UO1.

the selector 52 receives, through the first input terminal, the transmission signal T2 output from the processor 500, and receives, through the second input terminal, the transmission signal Tut output from the ROM 502. If the output signal UO1 is at level L, the selector 52 selects the transmission signal T2 output from the processor 500, and outputs it to the driver 562. The transmission signal T2 output from the selector 52 is transmitted to the main controller 22 via the communications line 15B.

In the main controller 22, the receiver 462 receives the transmission signal T2 via the communications line 15B. In the normal communications mode, the receiver 462 outputs the transmission signal T2 to the programmable device 40. The programmable device 40 receives the transmission signal T2 as the reception signal R1.

FIG. 3 shows the thick lines indicating communication paths formed between the main controller 22 and the gate driver 66 in the normal communications mode. In the normal communications mode, the selector 44 of the main controller 22 selects the transmission signal T1 from the programmable device 40 and transmits it to the gate driver 66. The selector 52 of the gate driver 66 selects the transmission signal T2 from the programmable device 50 and transmits it to the main controller 22. In other words, the communication paths are formed for enabling the communications between the programmable device 40 and the programmable device 50. When the uninterruptible power supply 100 is in operation, the communication paths can be used to exchange data between the programmable device 40 and the programmable device 50, thereby controlling the converter 4.

<Update Mode>

Figure 4:
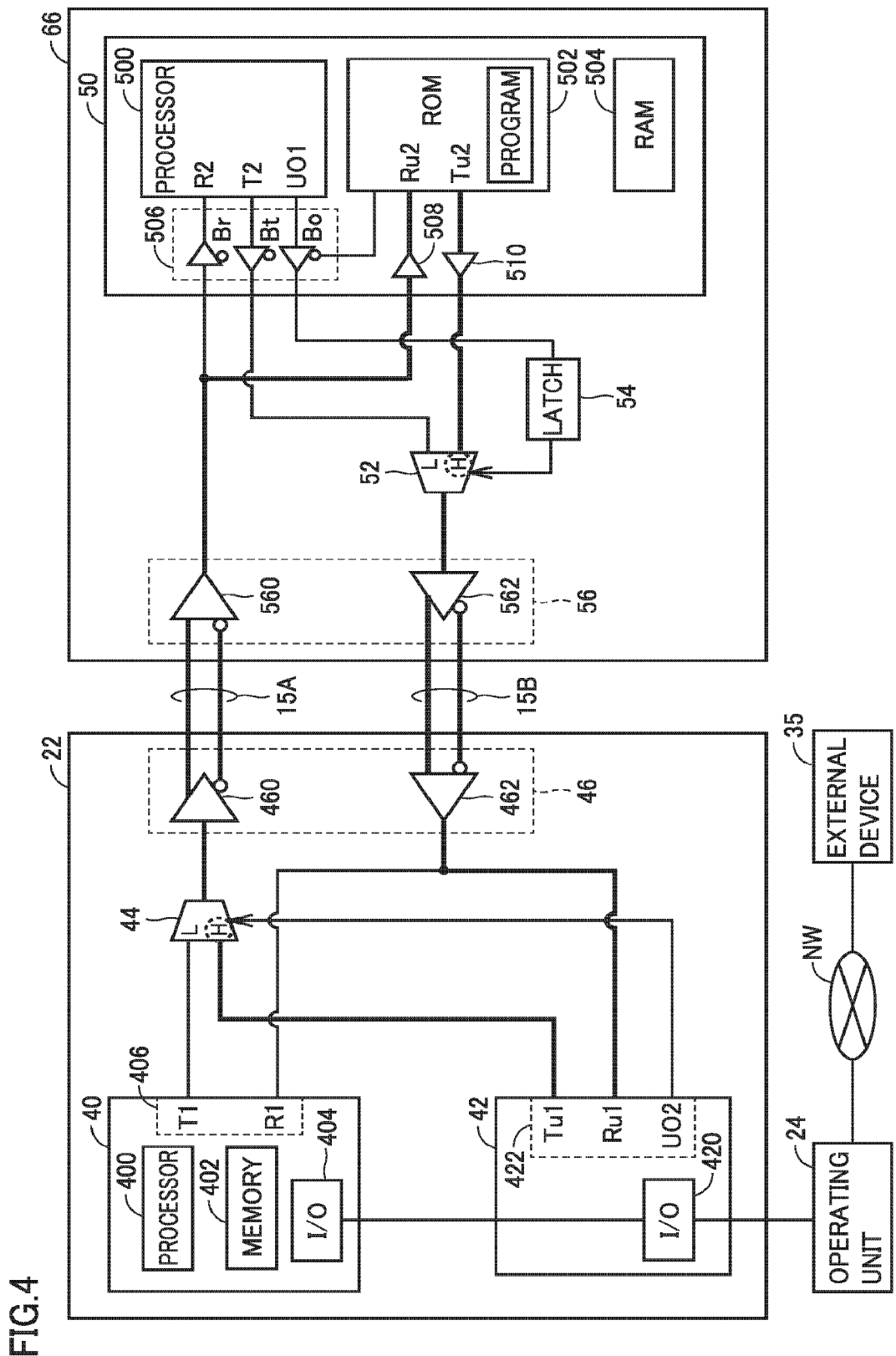
FIG. 4 is a diagram illustrating two-way communications in an update mode.

FIG. 4 is a diagram illustrating the two-way communications in the update mode.

Referring to FIG. 4, in the update mode, the device 42 of the main controller 22 and the ROM 502 of the gate driver 66 exchange the data for updating the programmable device 50, via the communications line 15.

The main controller 22 transitions from the normal communications mode illustrated in FIG. 3 to the update mode illustrated in FIG. 4 in response to the update mode transition flag Fu input from the operating unit 24. Specifically, in the normal communications mode, upon receiving the instruction to perform the update process from the user or the external device 35, the operating unit 24 sets the update mode transition flag Fu to on. The operating unit 24 outputs the update mode transition flag Fu being set to on to the device 42.

The device 42 transfers the update mode transition flag Fu, received from the operating unit 24, to the programmable device 40. The device 42 further receives data for updating the programmable devices 40 and 50, from the operating unit 24.

Upon receiving the update mode transition flag Fu, the programmable device 40 generates and outputs to the selector 44 a transmission signal T1 which includes the update mode transition flag Fu. In the normal communications mode, the output signal UO2 at level L is input to the selector 44. Accordingly, the selector 44 selects the transmission signal T1 (i.e., the update mode transition flag Fu) from the programmable device 40 in accordance with the output signal UO2 at level L, and outputs it to the driver 460. The transmission signal T1 output from the selector 44 is transmitted to the controller 14 via the communications line 15A.

The device 42 transfers to the programmable device 40 the data for updating the programmable device 40 provided by the operating unit 24. In the update mode, the programmable device 40 updates the program stored in the memory 402, in accordance with the data for update provided by the device 42.

In response to receiving the update mode transition flag Fu, the device 42 also activates the output signal UO2 to level H, and outputs the output signal UO2 to the selector 44. The device 42 further generates transmission signal Tu1 for update, based on the data for updating the programmable device 50 provided by the operating unit 24.

Upon being provided the output signal UO2 at level H, the selector 44 selects the transmission signal Tu1 from the device 42 and outputs it to the driver 460. The transmission signal Tu1 output from the selector 44 is transmitted to the gate driver 66 via the communications line 15A.

In the gate driver 66, in the normal communications mode, upon receiving the transmission signal T1 which includes the update mode transition flag Fu, the receiver 560 outputs the transmission signal T1 to the receive buffer Br. The receive buffer Br outputs the transmission signal T1 to the processor 500 as the reception signal R2. The reception signal R2 contains the update mode transition flag Fu being set to on.

Upon receiving the update mode transition flag Fu, the processor 500 activates the output signal UO1 to level H and outputs the output signal UO1 to the selector 44. The processor 500 also transfers the output signal UO1 to the ROM 502.

In response to receiving the update mode transition flag Fu, the processor 500 further deactivates the buffer circuit 506. In the update mode, the processor 500 is caused to stop exchanging data, thereby preventing malfunction of the processor 500 during the performance of update.

The output signal UO1 at level H is input to the selector 52 via the output buffer Bo and the latch circuit 54. The latch circuit 54 latches the output signal UO1 at level H. This deactivates the buffer circuit 506, allowing the selector 52 to be kept being provided with the output signal UO1 at level H even if the output buffer Bo is unable to output the output signal UO1.

Based on the output signal UO1 at level H input from the output buffer Bo, the ROM 502 determines that the normal mode is the update mode. In the update mode, the ROM 502 can substitute for the processor 500 and exchange the data for update with the main controller 22 (the device 42).

In response to the output signal UO1 at level H input from the latch circuit 54, the selector 52 selects the transmission signal Tu2 for update from the ROM 502, and outputs it to the driver 562. The transmission signal Tu2 output from the selector 52 is transmitted to the main controller 22 via the communications line 15B.

In the main controller 22, the receiver 462 receives the transmission signal Tu2 via the communications line 15B. In the update mode, the receiver 462 outputs the transmission signal Tu2 to the device 42. The device 42 receives the transmission signal Tu2 as the reception signal Ru1 for update.

FIG. 4 shows the thick lines indicating communication paths formed between the main controller 22 and the gate driver 66 in the update mode. In the update mode, the selector 44 of the main controller 22 selects the transmission signal Tu1 for update from the device 42 and transmits it to the gate driver 66. The selector 52 of the gate driver 66 selects the transmission signal Tu2 for update from the ROM 502 and transmits it to the main controller 22. In other words, the communication paths for enabling the communications between the device 42 and the ROM 502 are formed. In the update mode, the communication paths are used to exchange the data for update between the device 42 and the ROM 502, thereby allowing the update of the programmable device 50.

Here, the communication paths (see FIG. 3) used in the normal communications mode and the communication paths (see FIG. 4) used in the update mode described above share the communications line 15. Accordingly, the programmable device 50 of the gate driver 66 can be updated by the main controller 22, without having to increase the number of communications lines. As shown in FIG. 1, the main controller 22 is connected to the multiple controllers (the detectors 60, 62, and 64, the gate drivers 66, 68, and 70, and the switch OF 72) by the communications line 15. Accordingly, the communication paths for update is formed between the main controller 22 and the respective controllers by using the communications line 15, thereby allowing the main controller 22 to update all the controllers.

Note that, as noted above, in the gate driver 66, upon receiving the update mode transition flag Fu from the main controller 22, the programmable device 50 deactivates the buffer circuit 506 which is used for the two-way communications in the normal communications mode. This prevents the processor 500 from exchanging data during the update mode, and, consequently, the output of the output signal UO1 to the selector 52 is lost as well. In the present embodiment, the latch circuit 54 is provided which latches the output signal UO1 of the processor 500, and thereby the selector 52 is kept being provided with the output signal UO1 at level H. As a result, in the update mode, the two-way communications is maintained between the device 42 of the main controller 22 and the ROM 502, thereby allowing the program stored in the ROM 502 to be updated.

Upon completion of the updates of the programmable devices 40 and 50, the main controller 22 and the gate driver 66 perform the initialization processes on the programmable devices 40 and 50, respectively. The initialization processes cause the communications mode to transition from the update mode to the normal communications mode. Specifically, in the main controller 22, the device 42 outputs the output signal UO2 at level L to the selector 44. In the gate driver 66, the processor 500 outputs the output signal UO1 at level L to the selector 52 and restores the buffer circuit 506 to an available state.

Figure 5:
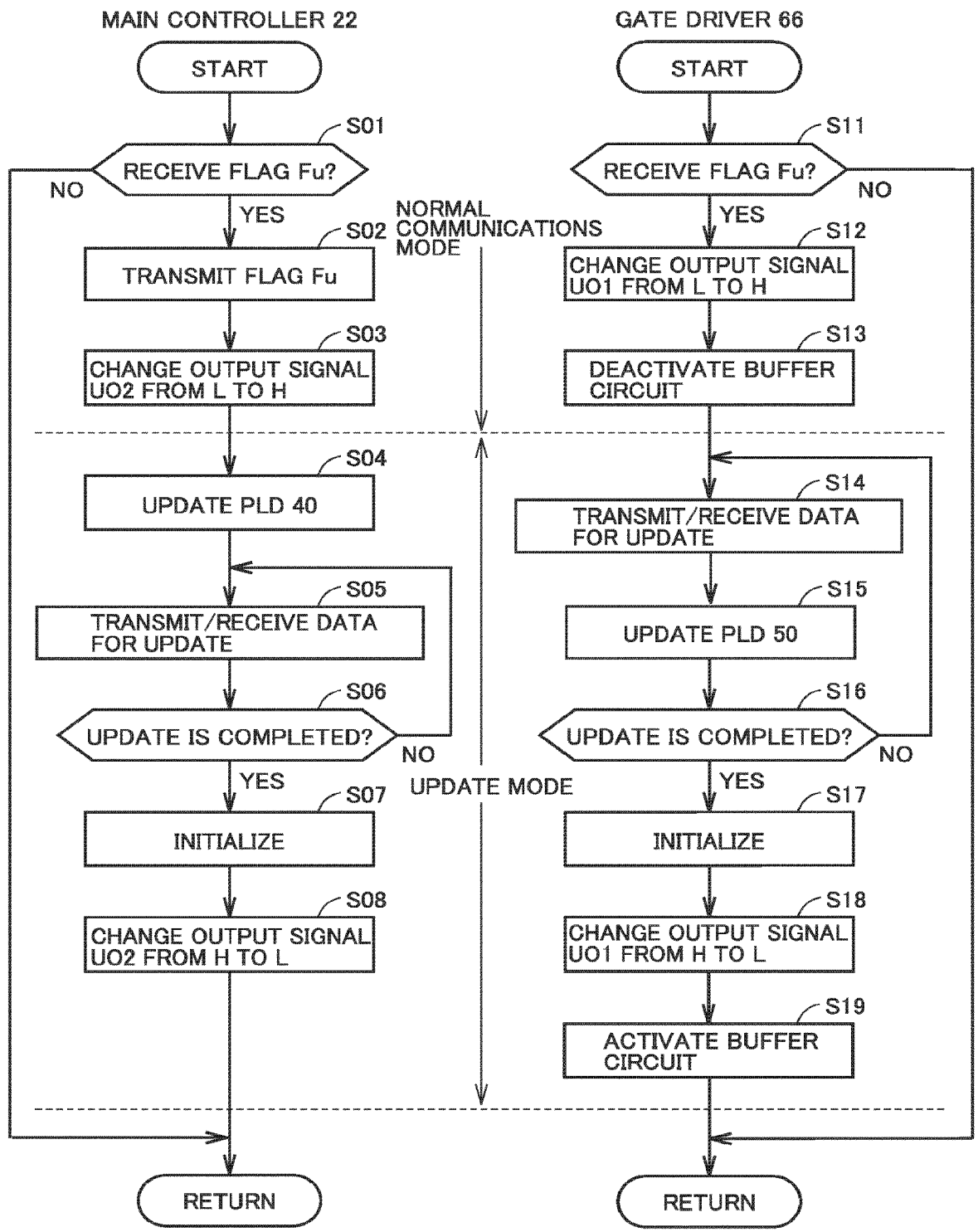
FIG. 5 is a flowchart illustrating a procedure for updating the main controller and a programmable device of the gate driver.

FIG. 5 is a flowchart illustrating a procedure for updating the programmable devices of the main controller 22 and the gate driver 66. In the figure, the process steps performed by the main controller 22 are illustrated to the left, and the process steps performed by the gate driver 66 are illustrated to the right.

In the normal communications mode, in step (hereinafter, the step will be simply denoted as "S") 01, in the main controller 22, the device 42 determines whether the update mode transition flag Fu is received from the operating unit 24. If the update mode transition flag Fu is received from the operating unit 24 (YES in S01), the device 42 transfers the update mode transition flag Fu to the programmable device 40.

In S02, the programmable device 40 generates and outputs to the selector 44 the transmission signal T1 which includes the update mode transition flag Fu. At this time, the selector 44 receives the output signal UO2 at level L from the device 42, and therefore, selects and transmits the transmission signal T1 (the update mode transition flag Fu) to the gate driver 66 via the communications line 15.

In S03, the device 42 outputs the output signal UO2 activated at level H to the selector 44. Upon receiving the output signal UO2 at level H, the selector 44 selects the transmission signal Tu1 for update from the device 42, instead of the transmission signal T1 from the programmable device 40, and outputs the transmission signal Tu1 to the driver 460. This causes the communications mode to transition from the normal communications mode to the update mode. In S03, the communication paths between the main controller 22 and the gate driver 66 are switched in hardware from the communication paths between the programmable device 40 and the gate driver 66 to the communication paths between the device 42 and the gate driver 66. Due to this, the programmable device 40 is not allowed to exchange data with the gate driver 66 during the update mode.

In S04, using the data for update provided by the device 42, the programmable device 40 updates the program stored in the memory 402. After the completion of update of the programmable device 40, the programmable device 40 waits until update of the programmable device 50 is for completed.

In S05, the device 42 exchanges the data for update with the gate driver 66, thereby updating the programmable device 50 of the gate driver 66.

In S06, the device 42 determines whether the updates of the programmable devices 40 and 50 are completed. In S06, based on the signal from the programmable device 40, the device 42 determines whether the update of the programmable device 40 is completed. In addition, based on the signal transmitted from the gate driver 66, the device 42 determines whether the update of the programmable device 50 is completed. If the update of the programmable device 50 is incomplete (NO in S06), the device 42 continues the process of S05.

If determined that the updates of the programmable devices 40 and 50 are completed (YES in S06), the programmable device 40, in S07, initializes the main controller 22. In response to the initialization, the device 42, in S08, outputs the output signal UO2 deactivated to level L to the selector 44. Upon receiving the output signal UO2 at level L, the selector 44 selects the transmission signal T1 from the programmable device 40, and outputs it to the driver 460. This causes the communications mode to transition from the update mode to the normal communications mode. In S08, the communication paths between the main controller 22 and the gate driver 66 are switched in hardware from the communication paths between the device 42 and the gate driver 66 to the communication paths between the programmable device 40 and the gate driver 66. Accordingly, the programmable device 40 exchanges the data with the gate driver 66, in accordance the updated program.

In the normal communications mode, in S11, the gate driver 66 determines whether the programmable device 50 receives the update mode transition flag Fu from the main controller 22. If the update mode transition flag Fu is received from the main controller 22 (YES in S11), the programmable device 50, in S12, outputs the output signal UO1 activated at level H to the selector 52.

Upon receiving the output signal UO1 at level H, the selector 52 selects the output signal Tu2 for update output from the ROM 502, instead of the transmission signal T2 from the processor 500, and outputs the output signal Tu2 to the driver 562. This causes the communication paths between the main controller 22 and the gate driver 66 to be switched in hardware from the communication paths between the programmable device 40 and the processor 500 to the communication paths between the device 42 and the ROM 502.

In S13, the programmable device 50 further deactivates the buffer circuit 506. This causes the communications mode to transition from the normal communications mode to the update mode. In the update mode, the programmable device 50 is not allowed to exchange the data with the programmable device 40.

In S14, the data for update is exchanged between the ROM 502 and the device 42 via the communications line 15, the program stored in the ROM 502 is thereby updated. In S16, the device 42 determines whether the update of the programmable device 50 is completed. In S16, the programmable device 50 determines whether the update of the programmable device 50 is completed, based on the signal from the ROM 502. If the update of the programmable device 50 is incomplete (NO in S16), the programmable device 50 continues the process steps of S14 and S15.

If determined that the update of the programmable device 50 is completed (YES in S16), the programmable device 50, in S17, initializes the gate driver 66. In response to the initialization, the programmable device 50, in S18, outputs the output signal UO1 deactivated to level L to the selector 52. Upon receiving the output signal UO1 at level L, the selector 52 selects the transmission signal T2 from the processor 500 and outputs it to the driver 562.

In S18, the communication paths between the main controller 22 and the gate driver 66 are switched in hardware from the communication paths between the device 42 and the ROM 502 to the communication paths between the programmable device 40 and the processor 500. Accordingly, the programmable device 50 exchanges the data with the programmable device 40 of the main controller 22, in accordance with the updated program.

In S19, the programmable device 50 further activates the buffer circuit 506. This causes the communications mode to transition from the update mode to the normal communications mode. The programmable device 50 returns to a state in which the programmable device 50 can exchange the data with the programmable device 40.

Advantageous Effects

As described above, according to the uninterruptible power supply 100 of Embodiment 1, where the main controller 22 and the controllers (e.g., the gate driver 66) are communicatively connected to each other by the serial communications line (the communications line 15), the main controller 22 can use this serial communications line to update the programs installed in the controllers. This obviates the need for connecting a computer to the controllers via the cables for programing. Accordingly, all the controllers can be efficiently updated with the simplified configuration.

In addition, since the operating unit 24 and the external device 35 are communicatively connected and the main controller 22 receives the data for update from the operating unit 24 and transmits it to the respective controllers, the user can even remotely update the controllers, using the external device 35.

Embodiment 2

Figure 6:
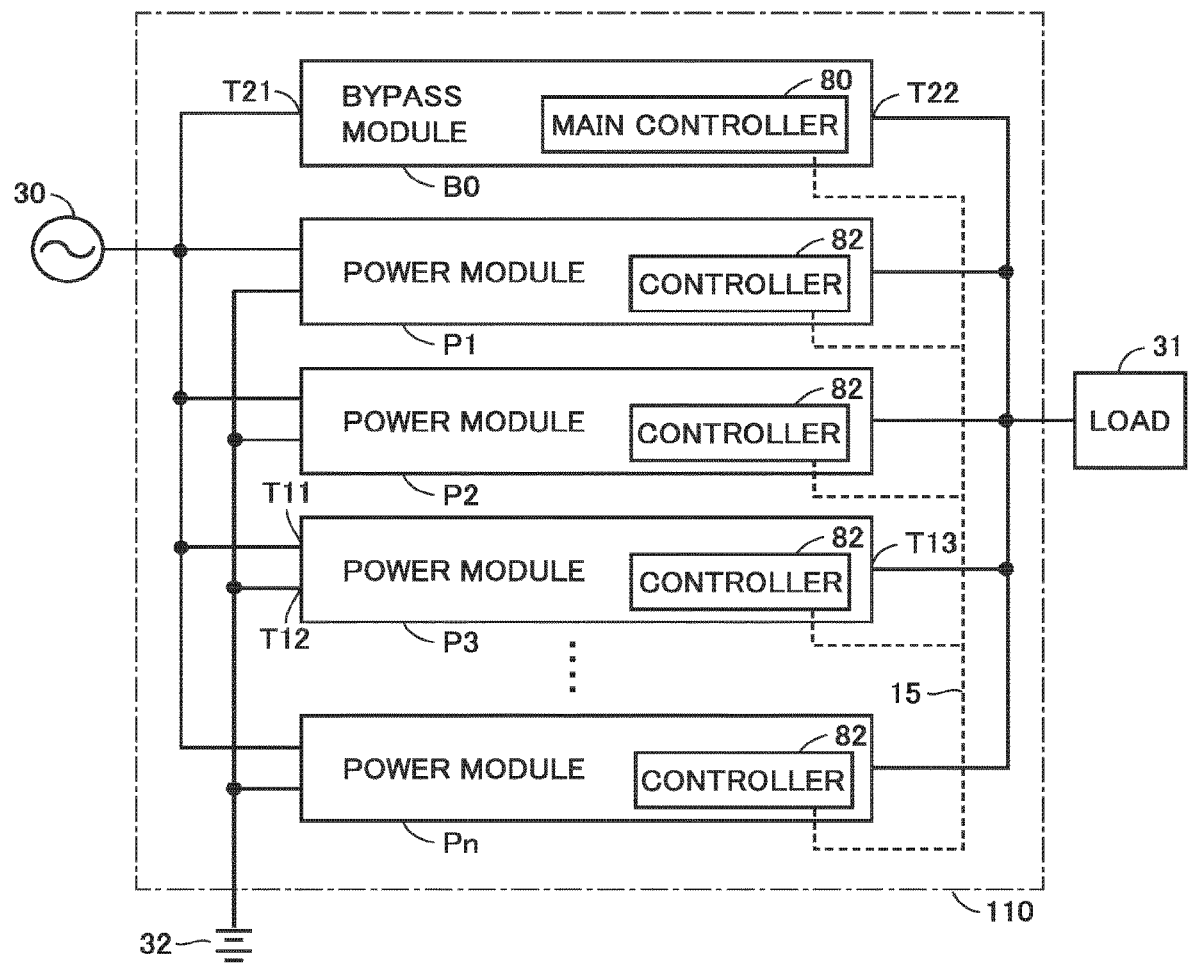
FIG. 6 is a circuit block diagram showing a configuration of an uninterruptible power supply according to Embodiment 2.

FIG. 6 is a circuit block diagram showing a configuration of the uninterruptible power supply according to Embodiment 2.

Referring to FIG. 6, an uninterruptible power supply 110 according to Embodiment 2 includes a bypass module B0, multiple power modules P1 through Pn (n is an integer greater than or equal to two), a battery 32, and a communications line 15. The bypass module B0 and the power modules P1 through Pn are connected to each other by the communications line 15. The communications line 15 directionally transfers data through serial communications.

The bypass module B0 has an AC input terminal T21, an AC output terminal T22, and a switch (not shown) connected between the AC input terminal T21 and the AC output terminal T22.

The power modules P1 through Pn are each a power converter module that has a converter and an inverter. In the following description, the power modules P1 through Pn may be collectively referred to as a "power module P." The power module P has an AC input terminal T11, a battery terminal T12, and an AC output terminal T13.

The AC input terminal T21 of the bypass module B0 and the AC input terminal T11 of each power module P are connected to a commercial AC power supply 30. The AC input terminal T21 and each AC input terminal T11 receive an AC voltage Vi at a commercial frequency supplied from the commercial AC power supply 30.

The battery terminal T12 of each power module P is connected to the battery 32. The battery 32 stores DC power. The battery terminal T12 of each power module P may be connected to a capacitor, instead of the battery 32.

The AC output terminal T22 of the bypass module B0 and the AC output terminal T13 of each power module P are connected to a load 31. In other words, the bypass module B0 and the power modules P1 through Pn are connected in parallel between the commercial AC power supply 30 and the load 31. The load 31 is driven by the AC power supplied from the bypass module B0 or the power module P.

Such an uninterruptible power supply is called a "modular uninterruptible power supply." The modular uninterruptible power supply internally includes parallel circuits formed of a number of power modules according to the capacity of the uninterruptible power supply. If N power modules are required to supply the power by the uninterruptible power supply, (N+1) power modules are implemented for purposes of redundancy, thereby improving the power supply quality. Such a scheme for the purposes of redundancy in modular unit in a single uninterruptible power supply is also called "hot swap." The how swap refers to a structure in which power modules can be stopped and are swappable while the uninterruptible power supply is in operation. With this, the power modules P are swappable while continuing the supply of the power by the uninterruptible power supply in the event of failure or inspection of a power module.

The uninterruptible power supply 110 has an inverter powering mode and a bypass powering mode. In the inverter powering mode, the AC power is supplied from the power module P to the load 31. In the inverter powering mode, the AC power supplied from the commercial AC power supply 30 is converted into DC power by the converter of the power module P, the DC power is converted into AC power by the inverter, and the AC power is supplied to the load 31. In the bypass powering mode, the AC power is supplied from the commercial AC power supply 30 to the load 31 via the bypass module B0. In the bypass powering mode, the AC power supplied from the commercial AC power supply 30 is supplied to the load 31, bypassing the power module P.

Figure 7:
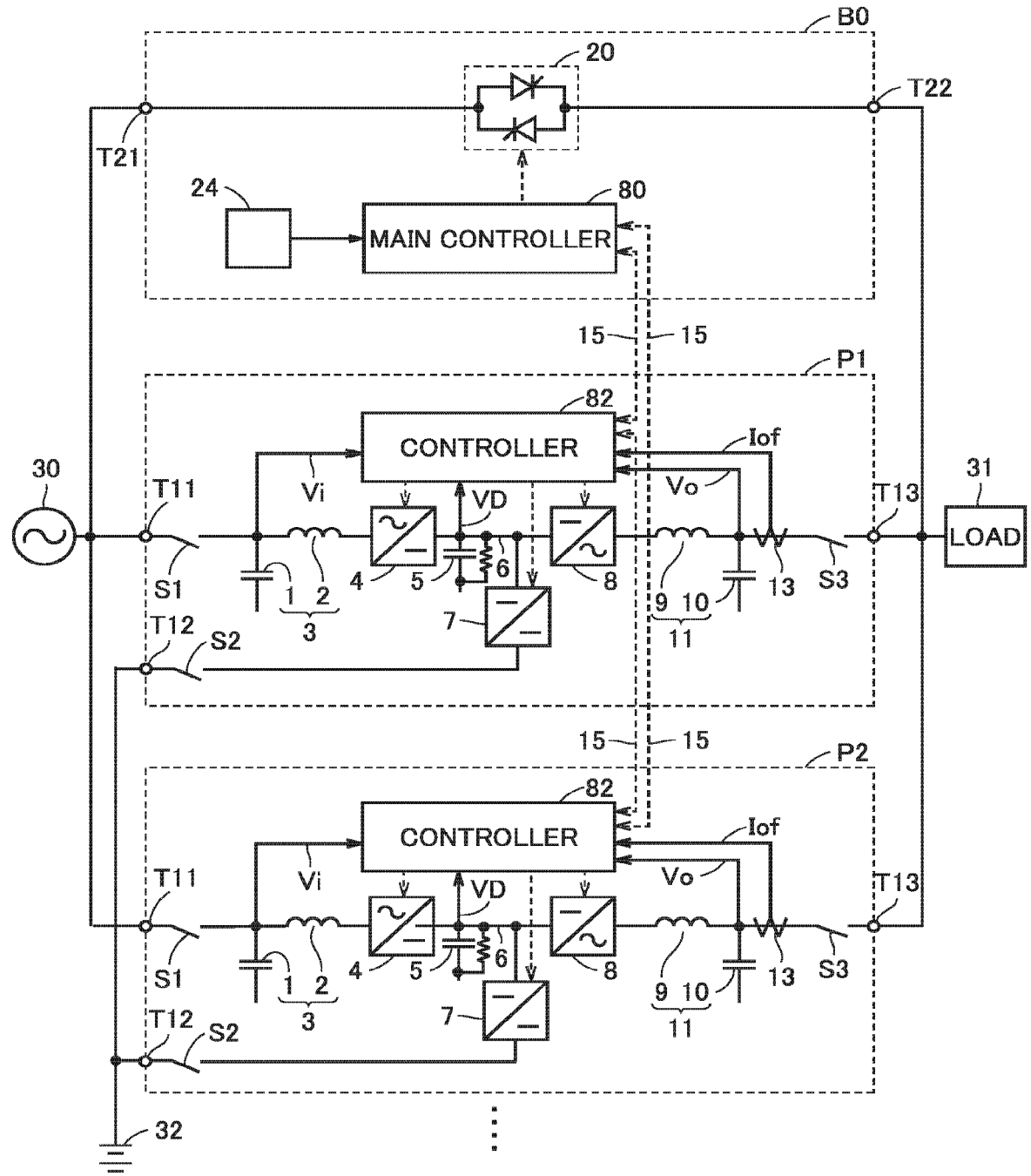
FIG. 7 is a circuit block diagram showing a configuration of a bypass module and a power module of FIG. 6.

FIG. 7 is a circuit block diagram showing a configuration of the bypass module B0 and the power module P of FIG. 6. The uninterruptible power supply 110 converts three-phase AC power from the commercial AC power supply 30 into DC power, converts the DC power into a three-phase AC power, and supplies the three-phase AC power to the load 31. For simplicity of the figure and description, FIG. 7 only shows circuits corresponding to one of three phases (U phase, V phase, and W phase).

As shown in FIG. 7, the bypass module B0 includes a semiconductor switch 20, a main controller 80, and an operating unit 24. The semiconductor switch 20 is connected between the AC input terminal T21 and the AC output terminal T22. The semiconductor switch 20 is, for example, a thyristor switch having a pair of thyristors connected in anti-parallel to each other. The semiconductor switch 20 is controlled by the main controller 80. In the inverter powering mode, the semiconductor switch 20 is turned off In the bypass powering mode, the semiconductor switch 20 is on.

The operating unit 24 includes multiple buttons operated by a user of the uninterruptible power supply 110, a display for showing various information, and so on. By operating the operating unit 24, the user can power on or off the uninterruptible power supply 110, select one of the bypass powering mode and the inverter powering mode, etc.

Figure 8:
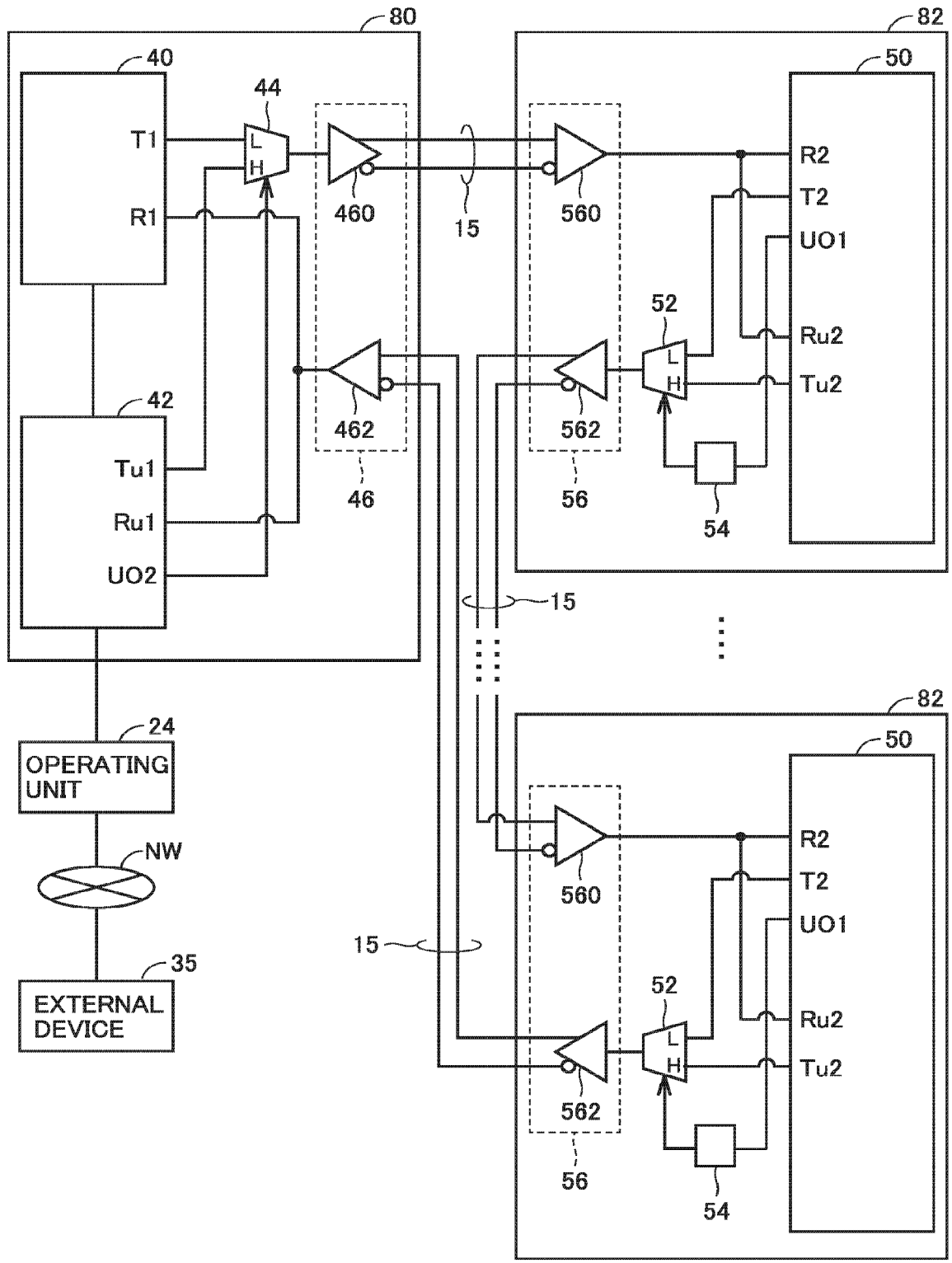
FIG. 8 is a block diagram showing a configuration of a main controller and a controller.

The operating unit 24 is connected to a communication network NW and capable of exchanging data with an external device 35 of the uninterruptible power supply 110 via the communication network NW (see FIG. 8). The external device 35 includes, for example, a PC or a server. The operating unit 24 may further include a USB connector. In this case, the operating unit 24 exchanges the data with the external device 35 via the USB connector.

With the uninterruptible power supply 110, programs installed in the main controller 80 and a controller 82 of the power module P can be updated by the user directly operating the operating unit 24 or remotely operating the operating unit 24 using the external device 35, similarly to the uninterruptible power supply 100 according to Embodiment 1 (see FIG. 1).

The power module P includes electromagnetic contactors S1 through S3, capacitors 1, 5, and 10, reactors 2 and 9, a converter 4, a DC line 6, a bi-directional chopper 7, an inverter 8, a current detector 13, and the controller 82.

The electromagnetic contactor S1 and the reactor 2 are connected in series between the AC input terminal T11 and an input node of the converter 4. The capacitor 1 is connected to a node N1 between the electromagnetic contactor S1 and the reactor 2. The electromagnetic contactor S1 is set to on when a corresponding power module P is bought into the operational status, and off when the corresponding power module P is stopped. The instantaneous value of an AC input voltage Vi appearing at the node N1 is detected by the controller 82. Based on the instantaneous value of the AC input voltage Vi, whether the uninterruptible power supply 110 is interrupted or not is determined.

The capacitor 1 and the reactor 2 form an AC filter 3. The AC filter 3 is a low-pass filter and passes therethrough the AC power at the commercial frequency from the commercial AC power supply 30 to the converter 4, and blocks the signal at the switching frequency, generated by the converter 4, from passing therethrough to the commercial AC power supply 30.

The converter 4 is controlled by the controller 82. In the normal operation during which the AC power is supplied from the commercial AC power supply 30, the converter 4 converts AC power into DC power, and outputs the DC power to the DC line 6. When the commercial AC power supply 30 is interrupted, the operation of the converter 4 is stopped.

The capacitor 5 is connected to the DC line 6, and smooths the voltage of the DC line 6. The instantaneous value of a DC voltage VD appearing at the DC line 6 is detected by the controller 82. The DC line 6 is connected to a high-voltage side node of the bi-directional chopper 7, and a low-voltage side node of the bi-directional chopper 7 is connected to the battery terminal T12 via the electromagnetic contactor S2.

The electromagnetic contactor S2 is on when a corresponding power module P is in use, and off during the maintenance of the corresponding power module P and a corresponding battery 32. The instantaneous value of a voltage VB across the battery 32 appearing at the battery terminal T12 is detected by the controller 82.

The bi-directional chopper 7 is controlled by the controller 82. In the normal operation, the bi-directional chopper 7 stores the DC power generated by the converter 4 into the battery 32. When the commercial AC power supply 30 is interrupted, the bi-directional chopper 7 supplies the DC power stored in the battery 32 to the inverter 8 via the DC line 6.

To store DC power into the battery 32, the bi-directional chopper 7 steps down the DC voltage VD of the DC line 6 and provides a resultant voltage to the battery 32. To supply the DC power stored in the battery 32 to the inverter 8, the bi-directional chopper 7 steps up the voltage VB across the battery 32 and outputs a resultant voltage to the DC line 6. The DC line 6 is connected to an input node of the inverter 8.

The inverter 8 has an output node connected to a first terminal of the reactor 9, and a second terminal (a node N2) of the reactor 9 is connected to the AC output terminal T13 via the electromagnetic contactor S3. The capacitor 10 is connected to the node N2. The instantaneous value of an AC output voltage Vo appearing at the node N2 is detected by the controller 82. The current detector 13 detects the instantaneous value of a current Io flowing through the AC output terminal T13 (i.e., the load 31) via the electromagnetic contactor S3 from the node N2, and provides the controller 82 with the signal Iof indicating the detection value.

The reactor 9 and the capacitor 10 form an AC filter 11. The AC filter 11 is a low-pass filter, and passes therethrough the AC power at the commercial frequency, generated by the inverter 8, to the AC output terminal T13, and blocks a signal at the switching frequency, generated by the inverter 8, from passing therethrough to the AC output terminal T13. The electromagnetic contactor S3 is controlled by the controller 82. The electromagnetic contactor S3 is turned on when a corresponding power module P is brought into the operational status. The electromagnetic contactor S3 is turned off when the corresponding power module P is stopped.

The controller 82 controls the entirety of the corresponding power module P, based on the AC input voltage Vi, the DC voltage VD, the voltage VB across the battery 32, the AC output current Io, and the AC output voltage Vo, for example. In other words, the controller 82 determines, based on the detection value of the AC input voltage Vi, whether the uninterruptible power supply 110 is interrupted, and controls the converter 4 and the inverter 8 in synchronization with the phase of the AC input voltage Vi.

In the normal operation, the controller 82 controls the converter 4 so that the DC voltage VD is a desired target voltage VDT. When the commercial AC power supply 30 is interrupted, the controller 82 stops the operation of the converter 4.

In the normal operation, the controller 82 further controls the bi-directional chopper 7 so that the voltage VB across the battery 32 is a desired target battery voltage VBT. When the commercial AC power supply 30 is interrupted, the controller 82 controls the bi-directional chopper 7 so that the DC voltage VD is a desired target voltage VDT.

In addition, the controller 82 is connected to the main controller 80 and the controllers 82 of the other power modules P by the communications line 15 and transmits/receives information to/from the main controller 80 and the controllers 82 via the communications line 15. A serial communications scheme is applied as scheme of the communications between the main controller 80 and each controller 82. The controller 82 controls the converters 4 and the inverters 8 so that the current is evenly shared among the power modules P.

Based on the signals from the power modules P, the main controller 80 controls the entirety of the uninterruptible power supply 110. Each controller 82 controls a corresponding power module P, in accordance with the control command provided by the main controller 80.

Specifically, based on output signals Iof of the current detectors 13, the main controller 80 determines the sum of the output currents Io of the power modules P, that is, a load current IL, and determines an appropriate number of operating power modules P that are required to supply the load current IL. The main controller 80 further compares the determined number of operating power modules and the current number of operating power modules, and determines whether to bring each power module P into the operational status or stop the power module P, based on a result of the comparison. The main controller 80 transmits a signal indicating the result of comparison to the respective controllers 82 via the communications line 15.

To stop a corresponding power module P, the controller 82 turns off corresponding electromagnetic contactors S1 and S3, and stops the operations of corresponding converter 4, bi-directional chopper 7, and inverter 8. To bring the corresponding power module P into the operational status, the controller 82 keeps the corresponding electromagnetic contactors S1 and S3 at the on state, and causes the corresponding converter 4, bi-directional chopper 7, and inverter 8 to continue the operations.

FIG. 8 is a block diagram showing a configuration of the main controller 80 and the controller 82.

Referring to FIG. 8, the main controller 80 and each controller 82 are bi-directionally communicatively connected by the communications line 15. The communications line 15 bi-directionally transfers data through serial communications. In the example of FIG. 8, the main controller 80 and the controllers 82 are connected in a daisy chain configuration. Note that the mode of connection between the main controller 80 and the controllers 82 is not limited to a daisy chain.

The main controller 80 has the same basic configuration as the main controller 22 of FIG. 2. In other words, the main controller 80 includes a programmable device 40, a device 42, a selector 44, and a communications I/F 44.

The controller 82 has the same basic configuration as the gate driver 66 of FIG. 2. In other words, the controller 82 includes a programmable device 50, a selector 52, a latch circuit 54, and a communications OF 56.

The main controller 80 and each controller 82 execute programs previously stored in memories, thereby controlling corresponding power modules P in cooperation with each other. The main controller 80 and each controller 82 have two communications modes, which are a "normal communications mode" in which they perform two-way communications while the uninterruptible power supply 110 is in operation, and an "update mode" in which they perform two-way communications for updating the programs stored in the respective memories. The normal communications mode is the default communications mode. Upon receiving, from the operating unit 24, an instruction to perform the update process, the main controller 80 and each controller 82 transitions the communications mode from the normal communications mode to the update mode.

Similarly to Embodiment 1, in Embodiment 2, the communications line 15 for use in the normal communications mode are also used to exchange the data for update between the main controller 80 and each controller 82, thereby allowing the update of the programmable device 40 of the main controller 80 and the programmable device 50 of the controller 82.

Figure 9:
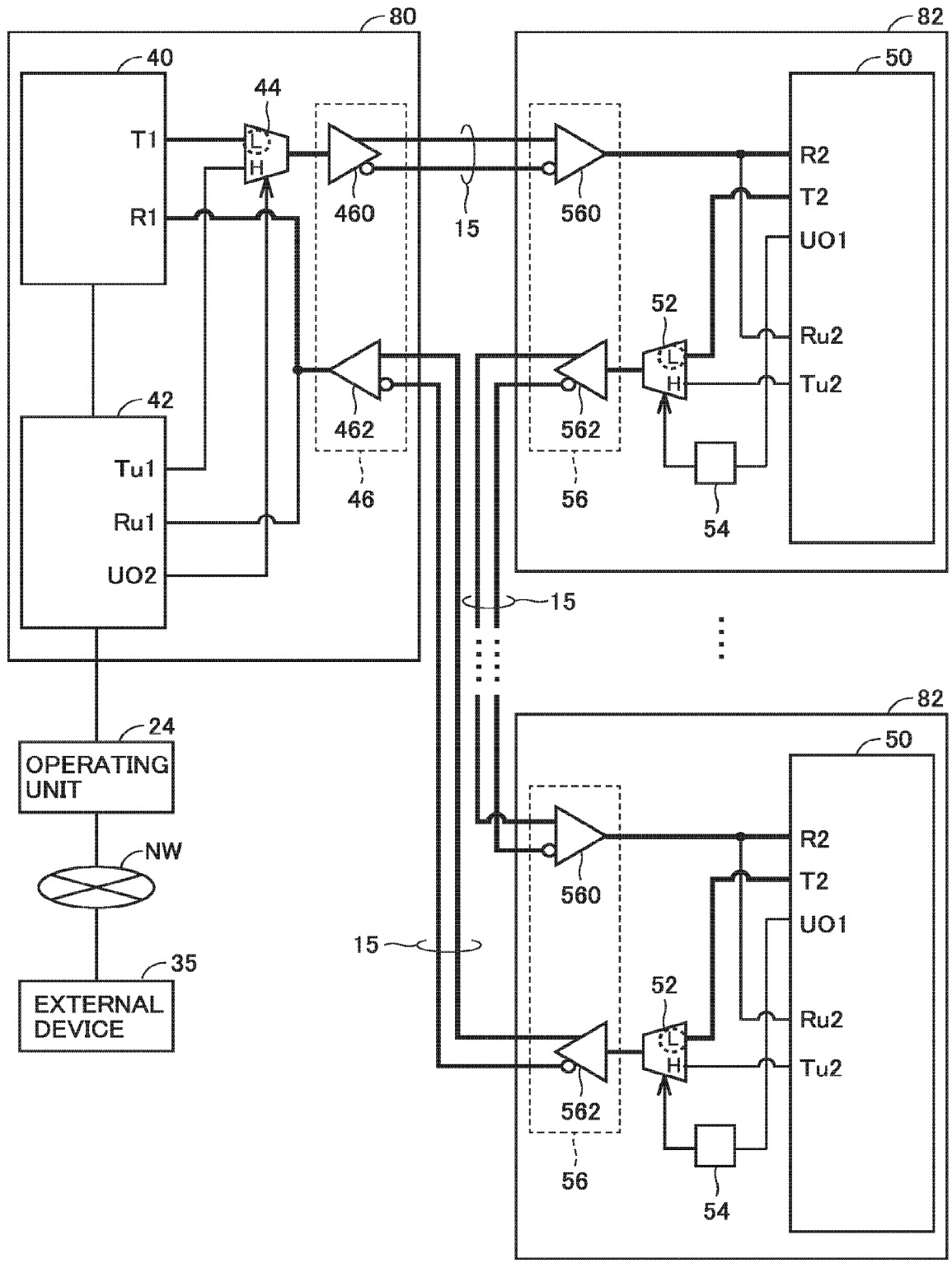
FIG. 9 is a diagram illustrating two-way communications in a normal communications mode.

FIG. 9 is a diagram illustrating two-way communications in the normal communications mode. As shown in FIG. 9, in the normal communications mode, the selector 44 of the main controller 80 selects the transmission signal T1 for regular communications, output from the programmable device 40, and transmits it to each controller 82 via the communications line 15. The selector 52 of each controller 82 selects the transmission signal T2 for regular communications, output from the programmable device 50, and transmits it to the main controller 80 via the communications line 15. In other words, communication paths are formed for enabling the communications between the programmable device 40 and the programmable device 50. While the uninterruptible power supply 110 is in the operation, each power module P can be controlled by using the communication path to exchange the data between the programmable device 40 and the programmable device 50.

Figure 10:
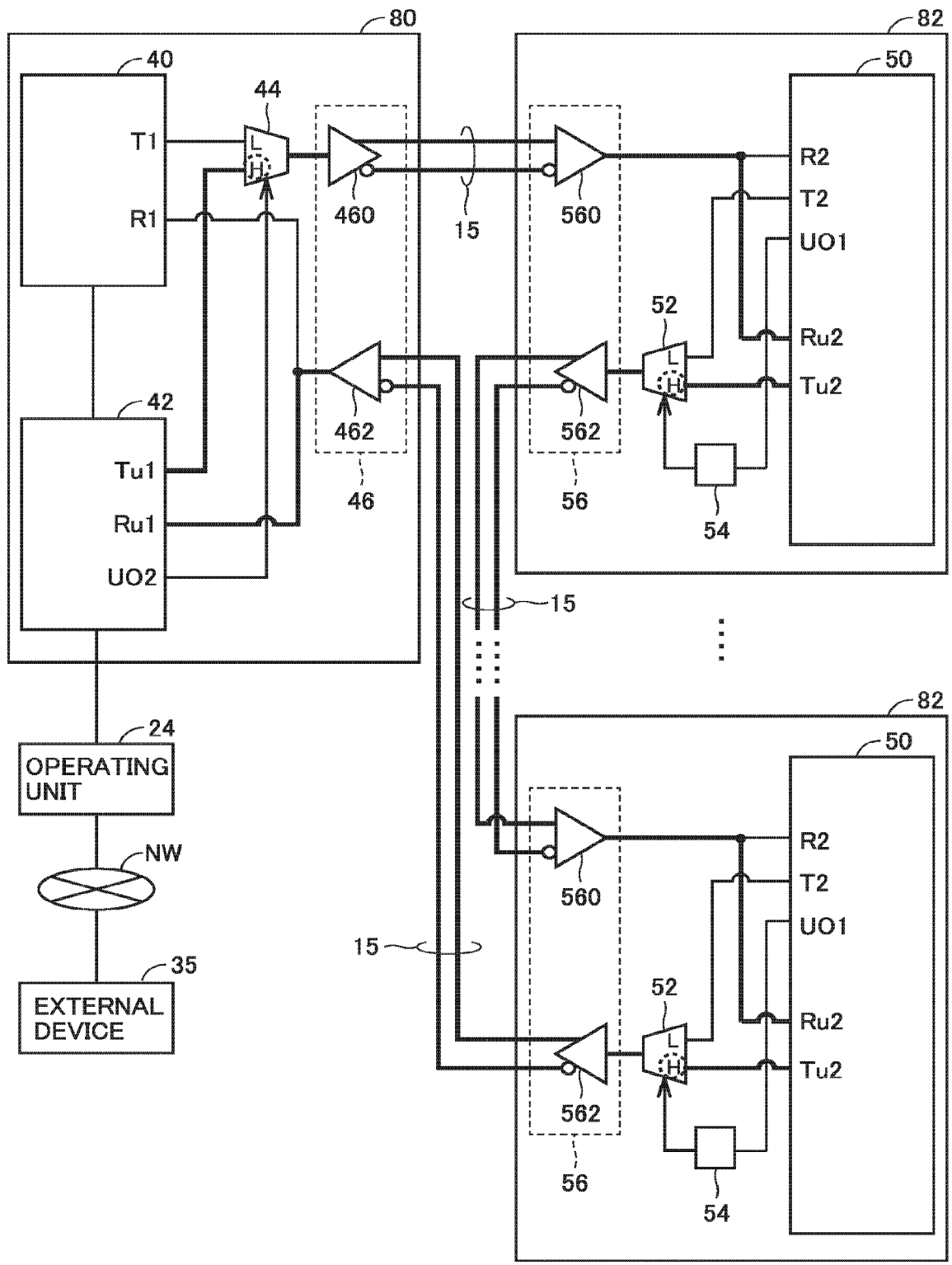
FIG. 10 is a diagram illustrating two-way communications in an update mode.

FIG. 10 is a diagram illustrating two-way communications in the update mode. In the update mode, the device 42 of the main controller 80 and a ROM (not shown) of the programmable device 50 of the controller 82 exchange the data for updating the programmable device 50. Note that the normal communications mode is transitioned to the update mode in response to an update mode transition flag Fu being input from the operating unit 24 to the main controller 80.

As described in Embodiment 1, in the main controller 80, upon receiving the update mode transition flag Fu, the selector 44 selects a transmission signal Tu1 for update, output from the device 42, and transmits it to the respective controllers 82 via the communications line 15. In each controller 82, when the programmable device 50 receives the update mode transition flag Fu in the normal communications mode, the selector 52 selects a transmission signal Tu2 for update, output from the programmable device 50, and transmits it to the main controller 80 via the communications line 15.

Note that, in the update mode, the programmable device 50 deactivates a buffer circuit 506 for regular communications. An output signal UO1 at level H input to the selector 52 is latched by the latch circuit 54.

In other words, the communication paths are formed for enabling communications between the device 42 and the programmable device 50. Each programmable device 50 can be updated by using the communication path to exchange the data for update between the device 42 and the programmable device 50.

Advantageous Effects

As described above, the modular uninterruptible power supply 110 according to Embodiment 2 provides the same advantageous effects as the uninterruptible power supply 100 according to Embodiment 1 described above. In other words, the main controller 80 can use the serial communications line (the communications line 15) to update the programs installed in the controllers 82. This obviates the need for connecting a computer to each controller 82 via a cable for programming. Accordingly, with such a simplified configuration, all the controllers 82 connected to the main controller 80 are efficiently updated.

In addition, since the operating unit 24 is communicatively connected to the external device 35 and the main controller 80 receives the data for update from the operating unit and transmits it to the respective controllers 82, the user can even remotely update the controllers 82, using the external device 35.

The presently disclosed embodiments should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST

1, 5, 10 capacitor; 2, 9 reactor; 3, 11 AC filter; 4 converter; 6 DC line; 7 bi-directional chopper; 8 inverter; 12, 13 current detector; 14, 82 controller; 22, 80 main controller; 15 communications line; 20 semiconductor switch; 24 operating unit; 30 commercial AC power supply; 31 load; 32 battery; 33 bypass AC power supply; 35 external device; 40, 50 programmable device; 42 device; 44, 52 selector; 46, 56 serial communications I/F; 54 latch circuit; 60, 62, 64 detector; 66, 68, 70 gate driver; 72 switch I/F; 100, 110 uninterruptible power supply; 400, 500 processor; 402 memory; 460, 562 driver; 406, 422 communications I/F; 404, 420 I/O circuit; 462, 560 receiver; 502 ROM; 504 RAM; 506 buffer circuit; Br receive buffer; Bo output buffer; Bt transmit buffer; B0 bypass module; P1 through Pn power module; S1 through S4 electromagnetic contactor; Fu update mode transition flag; T11, T21 AC input terminal; T12 battery terminal; T13, T22 AC output terminal; and NW communication network.

The invention claimed is:

1. An uninterruptible power supply, comprising:
a plurality of modules;
a main controller which includes a first programmable device and controls the plurality of modules;
a plurality of controllers that drive the plurality of modules through communications with the main controller, each controller including a second programmable device; and
a serial communications line that communicatively connects the main controller and the plurality of controllers,
the main controller further including:
a device for performing an update process for updating each of the first programmable device and the second programmable device; and
a first selector for connecting one of the first programmable device and the device to the serial communications line,
the second programmable device including:
a memory storing a program; and
a processor that drives a corresponding module by executing the program stored in the memory,
the plurality of controllers each further including a second selector for connecting one of the processor and the memory to the serial communications line, wherein
the first selector connects:
the first programmable device to the serial communications line while the uninterruptible power supply is in operation, and
the device to the serial communications line in response to the device receiving an instruction to perform the update process, and
the second selector connects:
the processor to the serial communications line while the uninterruptible power supply is in operation; and
the memory to the serial communications line in response to the processor receiving the instruction to perform the update process from the first programmable device while the uninterruptible power supply is in operation.

2. The uninterruptible power supply according to claim 1, wherein
in response to receiving the instruction to perform the update process, the device outputs to the first selector an instruction to select the device, and outputs to the first selector data for update for updating the second programmable device, and the memory obtains the data for update through the serial communications line, updates the program, and outputs to the second selector data generated through the update.

3. The uninterruptible power supply according to claim 1, wherein
the second programmable device further includes a buffer circuit for temporarily storing data input/output to/from the processor,
in response to receiving the instruction to perform the update process, the processor outputs to the second selector via the buffer circuit an instruction to select the memory, and deactivates the buffer circuit, and
the controller further includes a latch circuit for latching the instruction to select the memory.

4. The uninterruptible power supply according to claim 1, wherein
in response to receiving the instruction to perform the update process, the device further performs the update process for updating the first programmable device.

5. The uninterruptible power supply according to claim 1, wherein
the plurality of modules include:
a converter that converts alternating-current (AC) power supplied from an AC power supply to direct-current (DC) power;
an inverter that converts DC power supplied from the converter or a power storage device into AC power and supplies the AC power to a load;
a bi-directional chopper that selectively performs:
a charging operation for storing a portion of the DC power generated by the converter into the power storage device; and
a discharging operation for suppling the inverter with the DC power stored in the power storage device, and
the plurality of controllers include a plurality of gate drivers that drive the converter, the inverter, and the bi-directional chopper.

6. The uninterruptible power supply according to claim 1, wherein
the plurality of modules include a plurality of power converter modules connected in parallel to a load.

7. The uninterruptible power supply according to claim 6, wherein
the main controller and the plurality of controllers form a daisy chain connection by the serial communications line.

* * * * *